C. W. HAZELETT.
DRY CELL.
APPLICATION FILED MAY 9, 1919.

1,415,873.

Patented May 16, 1922.
2 SHEETS—SHEET 1.

INVENTOR
C. W. HAZELETT
BY
H. Grover
ATTORNEY

C. W. HAZELETT.
DRY CELL.
APPLICATION FILED MAY 9, 1919.

1,415,873.

Patented May 16, 1922.
2 SHEETS—SHEET 2.

INVENTOR
C. W. HAZELETT
BY
ATTORNEY

UNITED STATES PATENT OFFICE.

CLARENCE W. HAZELETT, OF LAKEWOOD, OHIO, ASSIGNOR TO NATIONAL CARBON COMPANY, INC., A CORPORATION OF NEW YORK.

DRY CELL.

1,415,873.  Specification of Letters Patent.  Patented May 16, 1922.

Application filed May 9, 1919. Serial No. 295,992.

*To all whom it may concern:*

Be it known that I, CLARENCE W. HAZELETT, a citizen of the United States, residing at Lakewood, in the county of Cuyahoga and State of Ohio, have invented a certain new and useful Improvement in Dry Cells, of which the following is a full, clear, and exact description.

This invention relates to an improvement in dry cells and more particularly to the type of dry cell which is normally adapted to remain inactive prior to being put in use, in order to eliminate the deterioration incident to storing dry cells for considerable periods. Such cells are commonly referred to by the trade name "reserve" batteries and will be so designated hereafter.

The usual battery of this type now marketed is made ready for active service by pouring an electrolyte solution or water into the cell through an opening in the top or in the hollow carbon electrode. This arrangement has a number of disadvantages. The liquid added diffuses slowly through the mix to the zinc container electrode and the cell is consequently not ready for use immediately when desired. It is difficult for the user to know just when enough liquid has been added. Therefore it is desirable to incorporate in the cell all of the moisture and other ingredients necessary, in the quantities and in the condition which have been found to give the best service in the ordinary dry cell.

The object of the present invention, broadly stated, is to construct a dry cell of the reserve type containing the full amount of moisture and all the ingredients in proper proportions, and which is adapted to be quickly and conveniently put into service.

Other objects will appear in the following description and drawings.

Figure 1:
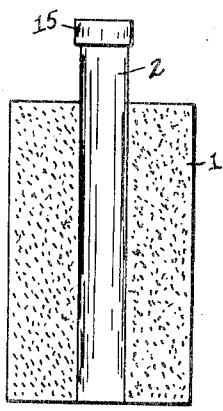
Fig. 1 is a cross section of a suitable bobbin or negative electrode for the dry cell.

For the negative electrode of the present reserve cell, I make use of a bobbin (Fig. 1) which is provided with the full amount of electrolyte solution such as is used in the ordinary dry cell. A bobbin made by tamping a mix 1, containing manganese peroxide and carbon moistened with the full amount of electrolyte solution, around a carbon electrode 2, has been found to give more and better service than any dry mix subsequently moistened. This is because a dry mix must be loosely packed or contain large particles and considerable voids, in order to permit the mix to soak up the liquid subsequently added. By using the regular moist mix bobbin, it is therefore unnecessary to use special mixes which will not give the service of the regular moist mixes, for other reasons which need not be set forth in detail in this description.

The bobbin is then provided with a quantity of flour or starch paste 3 adjacent its bottom, and also with a layer 4 of the same material around the sides. This material is retained in a paper cup 5 extending above the top of the mix a short distance. A second similar cup or wrapping of paper 6 is placed over the first mentioned cup, the upper edge extending to substantially the same height as the inner cup. A suitable method for forming the structure just described consists in inserting the outer paper wrapping or cup 6, or a sheet of paper adapted to form said cup, in a mold 7. The inner paper cup 5 is then fitted in the cup or wrapper 6 and a quantity of paste 3' poured into the inner cup. The bobbin is then inserted in the inner cup and pressed down into the paste to force it up around the sides, forming the layer 4 previously mentioned. When the paste has been forced up around the bobbin to the proper height, the bobbin will be supported in any suitable manner during the completion of the cell.

Figure 7:
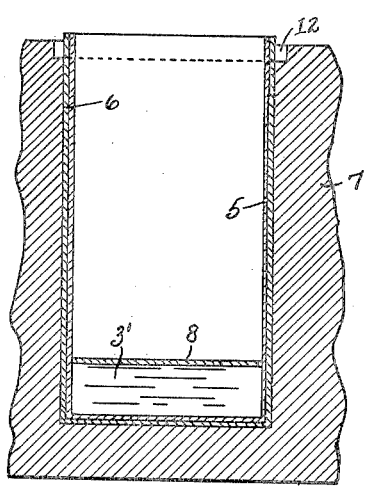
Fig. 7 is a view similar to Fig. 2, showing a slightly modified arrangement.
Figure 8:
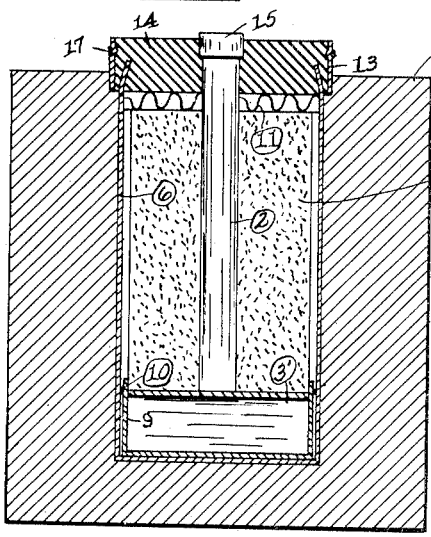
Fig. 8 is a cross section similar to Fig. 3, showing a cartridge involving the modified arrangement of Fig. 7.

My invention, however, does not necessarily involve the use of a layer 4 applied in this manner, or in fact in any other manner, as this layer may be omitted entirely. In the latter case a slightly flexible waterproof disk 8, such as a paraffined or tar treated paper disk, may be fitted over the paste as shown in Fig. 7, and the bobbin will be inserted in the cup without forcing the paste up around the sides as shown in Fig. 8. In this modification the disk 8 will fit the sides of the cup 5 tightly enough to support the bobbin while the cell is being completed. If the paste layer 4 on the sides is desired in this case, it may be conveniently secured by dipping the bobbin in paste before inserting in the cup 5.

Figure 9:
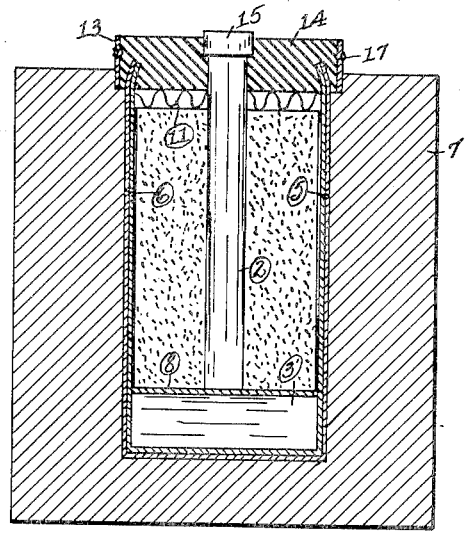
Fig. 9 is a further modification of the cartridge.

Another modified method of retaining the paste is shown in Fig. 9 which involves the use of a short cup 9 containing the paste located at the end of the bobbin. This may be attached thereto by means of a string 10, or simply held there by having a tight fit between the bottom of the bobbin and edge of the cup. The structure shown in Fig. 9 will then be inserted in the outer wrapper 6.

Figure 3:
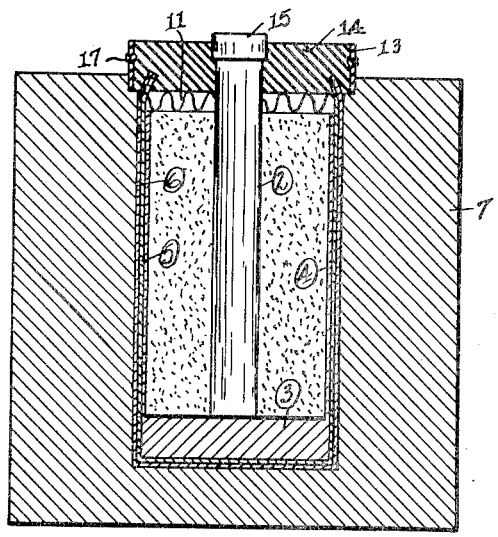
Fig. 3 is a cross section showing the cartridge and retaining device at a later stage when the cartridge is almost completed.
Figure 4:
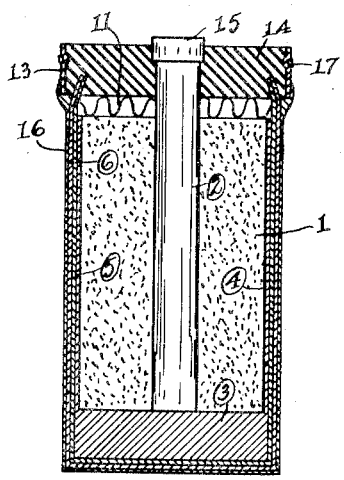
Fig. 4 is a cross section after the cartridge has been dipped to render it moisture proof.
Figure 2:
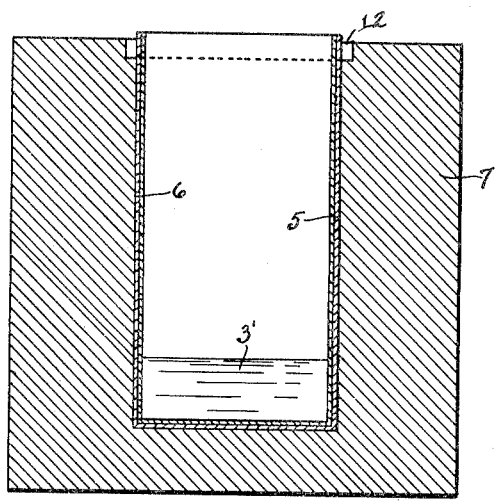
Fig. 2 is a cross section showing the cartridge containing the bobbin at an intermediate stage of its manufacture, and a retaining device for the cartridge which is used during its manufacture.

The cell will then be completed in each case in the following manner. A double faced corrugated paper disk 11 is placed over the top of the bobbin within the wrapper 6 as shown in Figs. 3 and 8. The mold 7 is provided with a circular depression 12 which is adapted to receive a zinc ring 13 having a groove or depression 17 around its periphery. The zinc ring will be supported in the mold at such a height that the outer wrapper 6 terminates in the space enclosed by the zinc ring. Pitch or other suitable material such as is commonly used in dry cells, is then poured into the ring above the paper disk 11 to substantially fill the ring and provide a seal 14. The upper edge of the wrapper 6 is thus completely embedded in the pitch seal. The carbon electrode 2 is of sufficient length so that the upper end which is provided with a brass terminal cap 15 projects through the seal.

The cartridge is then removed from the mold and dipped in a waterproofing solution such as celluloid, a distance a little above the lower edge of the zinc ring. When the celluloid dries a coating 16 is formed which completely waterproofs the paper and seals the cartridge so that the moisture of the mix and paste cannot escape and allow the cartridge to dry out. In this manner I secure a cartridge having all of the necessary constituents and the full amount of moisture enclosed in the form of a unitary structure adapted to be maintained indefinitely in this condition. An ordinary rubber band is snapped into the groove 17 of the zinc ring 13 for a purpose which will be referred to hereafter.

The zinc container electrode 18 which is used in connection with the cartridge is the same as the ordinary zinc dry cell can except that it is provided with groove 19 similar to the groove 17 of the zinc ring. It is also preferable to use a zinc can and zinc ring which do not have lap soldered edges, as a better fit can then be secured between the zinc can and ring.

Figure 5:
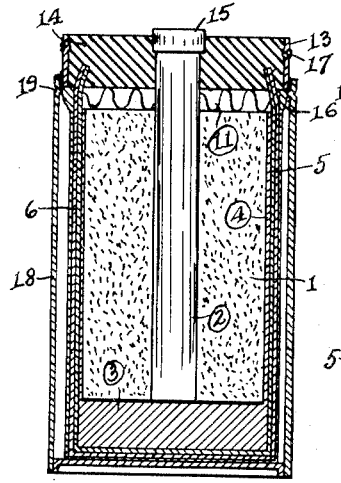
Fig. 5 is a cross section of the completed cell with the parts in the positions occupied when the cell is inactive.

Prior to placing the cell in service, and during shipping, the cartridge will be carried in the zinc container in the inactive position, the top of the cartridge projecting a short distance above the top of the zinc can as shown in Fig. 5. The diameter of the can and cartridge is such that there is a loose fit between the two.

When the cell is to be put into active condition for service, the outer waterproof wrapping 6 is removed by tearing it off in any suitable manner. This may be done by making a small cut in the wrapper near the zinc ring and with this as a beginning the remainder may be readily torn off. A cut may also be made around the paper adjacent the lower edge of the zinc ring by means of a knife or sharp instrument. The paper may also be scored prior to waterproofing to indicate to the user the position at which the paper should be cut. The outer wrapper may then, by exercise of due care, be removed from the bobbin without disturbing the inner paste-retaining cup. After removing the wrapper the celluloid on the ring is scraped off, the cartridge is fitted in the zinc can and the cartridge is forced downward until the inward projection formed by the groove of the can springs into the groove of the zinc ring. The compressibility of the rubber ring in groove 17 permits this to be done readily and the rubber ring then serves as a gasket or sealing means between the zinc ring and can to prevent escape of moisture while the cell is in use. The sealing means set forth provides a construction in which a separate zinc can and cartridge can be readily fitted together by a consumer to secure the air-tight closure which is necessary for dry cells. Although celluloid is preferred as a waterproofing material, nevertheless my invention is not necessarily limited to a cartridge dipped in celluloid, as paraffine and other materials may be used for waterproofing, or the wrapper may be made from waterproof materials.

Figure 6:
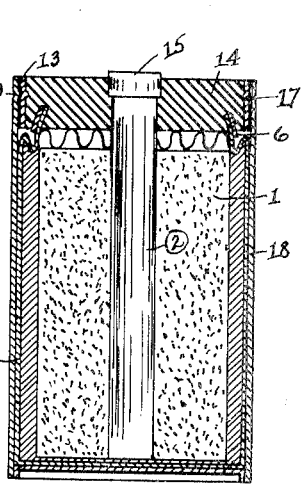
Fig. 6 is a similar cross section of the cell after the impervious covering of the cartridge has been removed and the cartridge forced into the can to place the parts in position for generating current.

Upon pressing the cartridge into the can as set forth, the paste 3' in the bottom is forced up between the cartridge and inner cup in the modification of Fig. 6, to press the lining uniformly against the zinc. The quantity of paste in the bottom is accordingly adjusted so that it is adapted to fill clearance space between the inner cup and zinc can. In filling this space it will be noted that the paper cup must be expanded. The increase may be taken care of in the modification of Fig. 6 by overlapping the edges of the cup 5 without pasting or gluing them together, or the paper cup may be simply permitted to split to take care of the expansion.

In order to clearly illustrate the separate thicknesses of material surrounding the depolarizer, it has been necessary in the drawings to exaggerate their thickness and as a result the difference between the diameters of the unwrapped electrode and zinc can is exaggerated. As a matter of fact the celluloid covering and outer paper wrapper are so thin that their removal only slightly decreases the diameter of the cartridge, so that little paste is required to fill the clearance between the cartridge and can.

In case the short cup of Fig. 9 is used, the action will be essentially the same as in the modifications referred to previously, but the short cup will be more easily split. If the waterproof disk 8 is used on top of the paste 3', it will not materially impede the paste from squeezing out of the container. The disk will also serve to maintain the paste in a more liquid condition, as it will separate the paste from the zinc chloride of the cartridge, which material has the effect of gelatinizing flour paste.

Having described my invention, what I claim is:

1. A cartridge adapted to coact with a metal cup to form a dry battery, said cartridge comprising a depolarizing electrode bobbin having a body of fluid material attached to its lower end in such a way that the fluid material can be caused to rise between the bobbin and said metal cup on pressing the bobbin into said metal cup.

2. A cartridge adapted to coact with a metal cup to form a dry battery, said cartridge comprising a depolarizing electrode bobbin having a body of paste attached to its lower end in such a way that the paste can be caused to rise between the bobbin and said metal cup on pressing the bobbin into said metal cup.

3. A cartridge adapted to coact with a metal cup to form a dry battery, said cartridge comprising a depolarizing electrode bobbin having a body of paste attached to its lower end, a removable protective coating enclosing the body of paste, and means for supporting the body of paste when the protective coating is removed, said supporting means being adapted to permit the paste to rise between the bobbin and said metal cup on pressing the bobbin into said metal cup.

4. A cartridge adapted to coact with a metal cup to form a dry battery, said cartridge comprising a depolarizing electrode bobbin containing electrolyte solution and having a body of paste attached to its lower end, a removable impervious coating enclosing the paste and the bobbin, and means for supporting the body of paste when the impervious coating is removed, said supporting means being adapted to permit the paste to rise between the bobbin and said metal cup on forcing the bobbin into said metal cup.

5. A cartridge adapted to coact with a metal cup to form a dry battery, said cartridge comprising a depolarizing electrode bobbin containing electrolyte solution and having a body of paste attached to its lower end, a removable impervious coating enclosing the paste and the bobbin, the impervious coating terminating at the upper end of the bobbin in a pitch seal, a ring of strong material about said seal and means for supporting the body of paste when the impervious coating is removed, said supporting means being adapted to permit the paste to rise between the bobbin and said metal cup on pressing the bobbin into said metal cup.

6. In combination, a cartridge comprising a depolarizing electrode bobbin containing electrolyte solution and having a body of paste attached to its lower end, a removable impervious coating enclosing the paste and the bobbin, said impervious coating terminating at the upper end of the bobbin in a pitch seal, a metal ring about said seal, a metal cup conforming in size and shape to said cartridge, locking devices on the metal cup and the metal ring adapted to engage when said cartridge is positioned in said metal cup, and means for supporting said body of paste when said impervious coating is removed, said supporting means being adapted to permit said paste to rise between the bobbin and the metal cup when the cartridge is positioned in the metal ring and metal cup.

In testimony whereof, I hereunto affix my signature.

C. W. HAZELETT.